Nov. 3, 1964 G. V. MORRIS ET AL 3,155,211

COMMUNICATION RECEIVER

Filed Feb. 27, 1962 4 Sheets-Sheet 1

INVENTORS
George V. Morris
Pentti V. Sarlund
BY Francis W. Crotty
ATTORNEY

COMMUNICATION RECEIVER

Filed Feb. 27, 1962 4 Sheets-Sheet 2

INVENTORS
George V. Morris
Pentti V. Sarlund
BY Francis W. Crotty
ATTORNEY

Nov. 3, 1964 G. V. MORRIS ET AL 3,155,211

COMMUNICATION RECEIVER

Filed Feb. 27, 1962 4 Sheets-Sheet 3

INVENTORS
George V. Morris
Pentti V. Sarlund
BY Francis W. Crotty
ATTORNEY

INVENTORS
George V. Morris
Pentti V. Sarlund
BY Francis W. Crotty
ATTORNEY

United States Patent Office 3,155,211
Patented Nov. 3, 1964

3,155,211
COMMUNICATION RECEIVER
George V. Morris, Norridge, and Pentti V. Sarlund, Chicago, Ill., assignors to Zenith Radio Corporation, Chicago, Ill., a corporation of Delaware
Filed Feb. 27, 1962, Ser. No. 177,144
25 Claims. (Cl. 194—1)

The present invention relates in general to a communication receiver, and more particularly to a communication receiver of the type in which code-determining apparatus must be adjusted in accordance with a given adjustment before a received intelligence signal may be intelligibly reproduced. The invention also concerns itself with decoding apparatus featuring a coin controlled switching mechanism. This application is a continuation-in-part of copending application Serial No. 755,635, filed August 18, 1958, now abondoned.

Subscription television systems are known in which video signals, encoded in accordance with a coding schedule, are transmitted along with code pulses related to the coding schedule but, themselves, requiring interpretation to arrive at that schedule. For example, they may be applied to the input terminals of a permutation switch and appear at the output terminals thereof permuted so as to represent the code schedule directly. Systems of this general type are shown in copending application Serial No. 281,418 filed April 9, 1952, and issued July 15, 1958 as Patent 2,843,656, in the name of George V. Morris et al., Serial No. 326,107 filed December 15, 1952 and issued February 11, 1958 as Patent 2,823,252, in the name of Jack E. Bridges, and Serial No. 310,309 filed September 18, 1952, now Patent No. 3,103,550, in the name of Alexander Ellett, all assigned to the assignee of the present application.

With such systems, it is contemplated that each subscriber be informed in advance of the transmission regarding the specific permutation required to interpret the coding information conveyed in the broadcast so that the permuting or decoding apparatus of the subscriber's receiver may be properly adjusted. In order to prevent unauthorized instrusion upon this traffic, various safeguards have been employed directed to the purpose of individualizing the permutation pattern of each subscriber. In other words, each subscriber's decoding apparatus has been individualized so that a specifically different adjustment of his decoder is required in order to effect decoding of a given program. In this way, the information provided to one subscriber is tailored to have decoding significance to his equipment solely and to have no such significance in connection with the equipment of neighboring subscribers. Such practices are particularly effective even though they entail bookkeeping records which are not required if the decoding apparatus has not been individualized.

It is proposed herein to provide a subscription television system in which the decoding information for each program is uniform for all subscribers although various features concerning coin payment, coin refunding and reset, following each program as disclosed herein, are adaptable to systems which employ individualized decoding apparatus as well. When uniform decoding information is used it may be made public and communicated indiscriminately by any method of communication, even by publication in a newspaper. This is referred to as an "open code" system. In accordance with such a system, the utilization of the published information to effect decoding of a subscription television program is made dependent upon the deposit of a subscription fee, in the correct amount, to operate the decoder.

Accordingly, it is a principal object of the present invention to provide an improved subscription television system in which the establishment of decoding interconnection between a device for developing applied control signals and a decoder is made through a coin operable device.

It is another object of the invention to provide decoding apparatus for such a subscription system having a coin-operated device of improved construction and performance.

It is a specific object of the invention to provide a coin-operable device for such a subscription system in which the coin demand, representing the subscription fee, is related to the adjustment of the code-determining elements of the subscriber's decoding apparatus.

It is another and salient object of the invention to afford subscribers of prepared television programs the privilege of sampling them before having to commit themselves to payment for such programs.

A communication receiver, constructed in accordance with one of the aspects of the invention, comprises an adjustable code-determining apparatus including a plurality of code-determining elements to be adjusted in accordance with a predetermined adjustment. There are means coupled to the code-determining apparatus for registering a particular charge determined by the instantaneous adjustment of the code-determining elements.

A subscription television receiver for utilizing a received intelligence signal, constructed in accordance with another aspect of the invention, comprises means, including a plurality of adjustable code-determining elements, for developing a control signal having a code pattern dependent upon the adjustment of the elements. A coin-operable device is coupled to the signal-developing means for registering a particular coin demand determined by the adjustment of the code-determining elements. There are means responsive to satisfying or acknowledging the coin demand for providing a control effect.

In accordance with one feature of the invention, the control signal is developed in a permutation type of switch mechanism capable of establishing any permutation pattern among a large series of patterns, the selection of one being under the control of manually-adjustable knobs. At least one of these knobs is mechanically connected with the coin register of the coin-operable device to the end that the coin demand represented by the operating position of that register manifests the adjustment of such control knob.

Another feature of the invention contemplates the reception of a coded signal and decoding of that received signal as soon as a requisite number of coins have been deposited and permitting a subscriber to restore the apparatus to its rest position any time within a sampling interval, such restoration effecting a refund of deposited coins and, at the same time, disabling the decoder.

In accordance with still a further feature, the coins deposited to initiate the sampling interval for the benefit of the subscriber are deposited for collection if the subscriber does not exercise the election of rejecting the program and obtaining a refund of such coins.

Still another feature protects the subscriber against inadvertent manipulation of the code-determining elements during the program interval by locking these elements against adjustment until a decoding mechanism has been reset by the subscriber.

The features of this invention which are believed to be new are hereinafter set forth with particularity in the appended claims. The invention, together with further objects and advantages thereof, may best be understood however, by reference to the following description in conjunction with the accompanying drawings in which:

Figure 4:
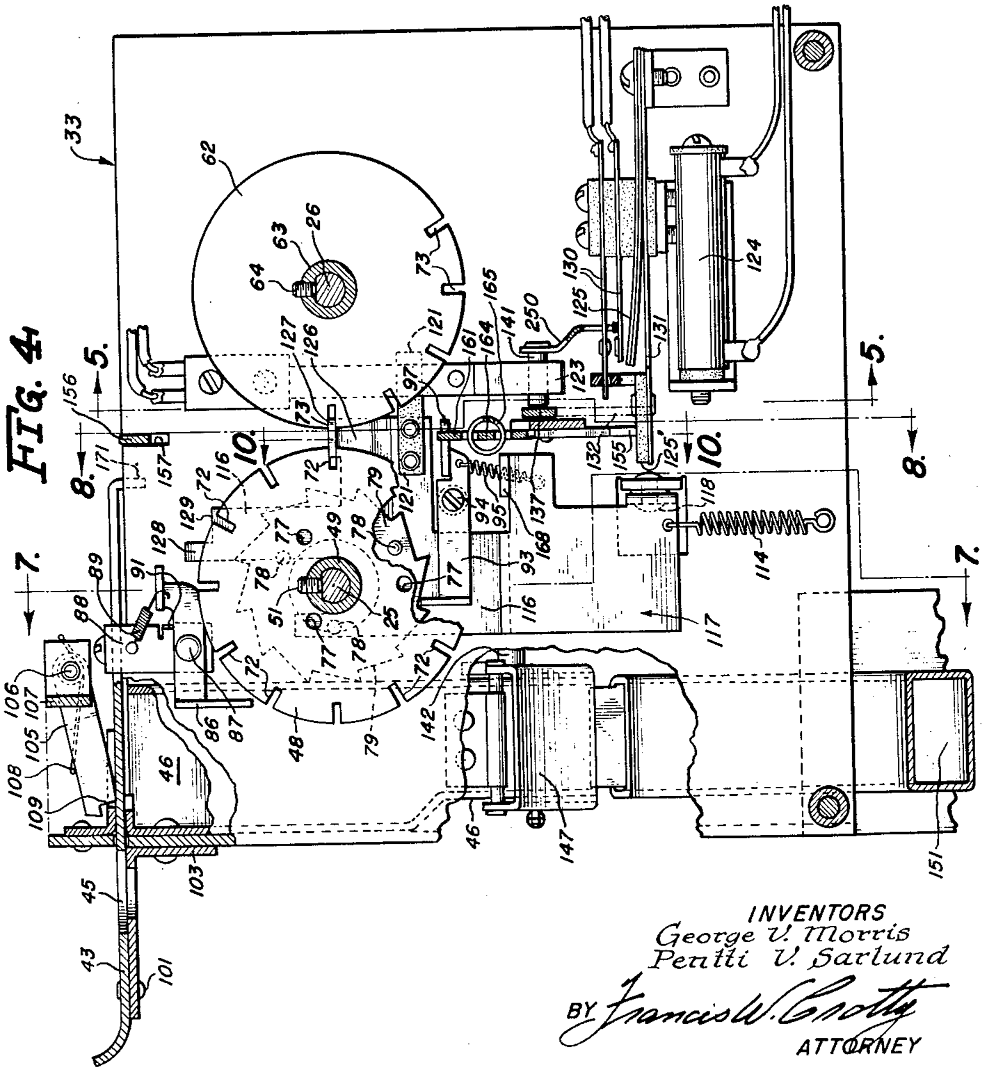
FIGURE 4 is a front elevational view, partly in section, of a coin operated permutation switch device included in a decoding apparatus constructed in accordance with the present invention.
Figure 10:
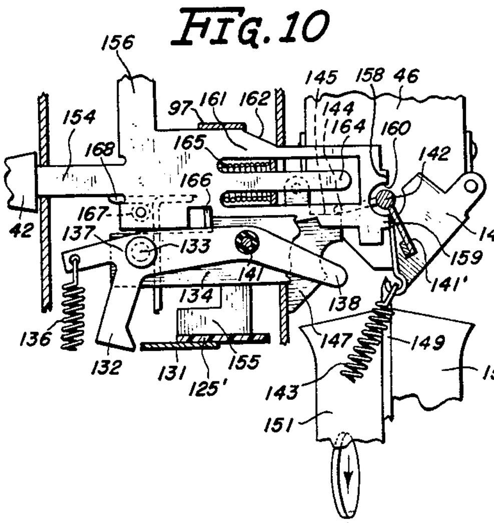
Figure 11:
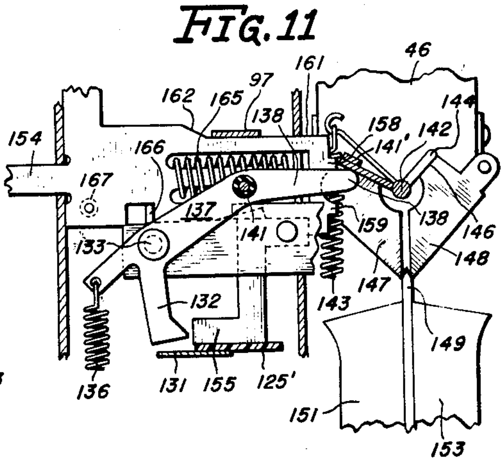
Figure 12:
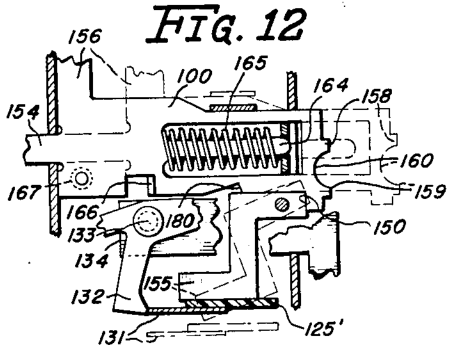

FIGURES 10 and 11 are fragmentary sectional views of various operating positions of the reset slide and coin return mechanism and taken on line 10—10 of FIGURE 4; and FIGURE 12 is another fragmentary sectional view of the mechanism shown in FIGURES 10 and 11 but with foreground components broken away to reveal posterior details.

Figures 1, 2, 3:
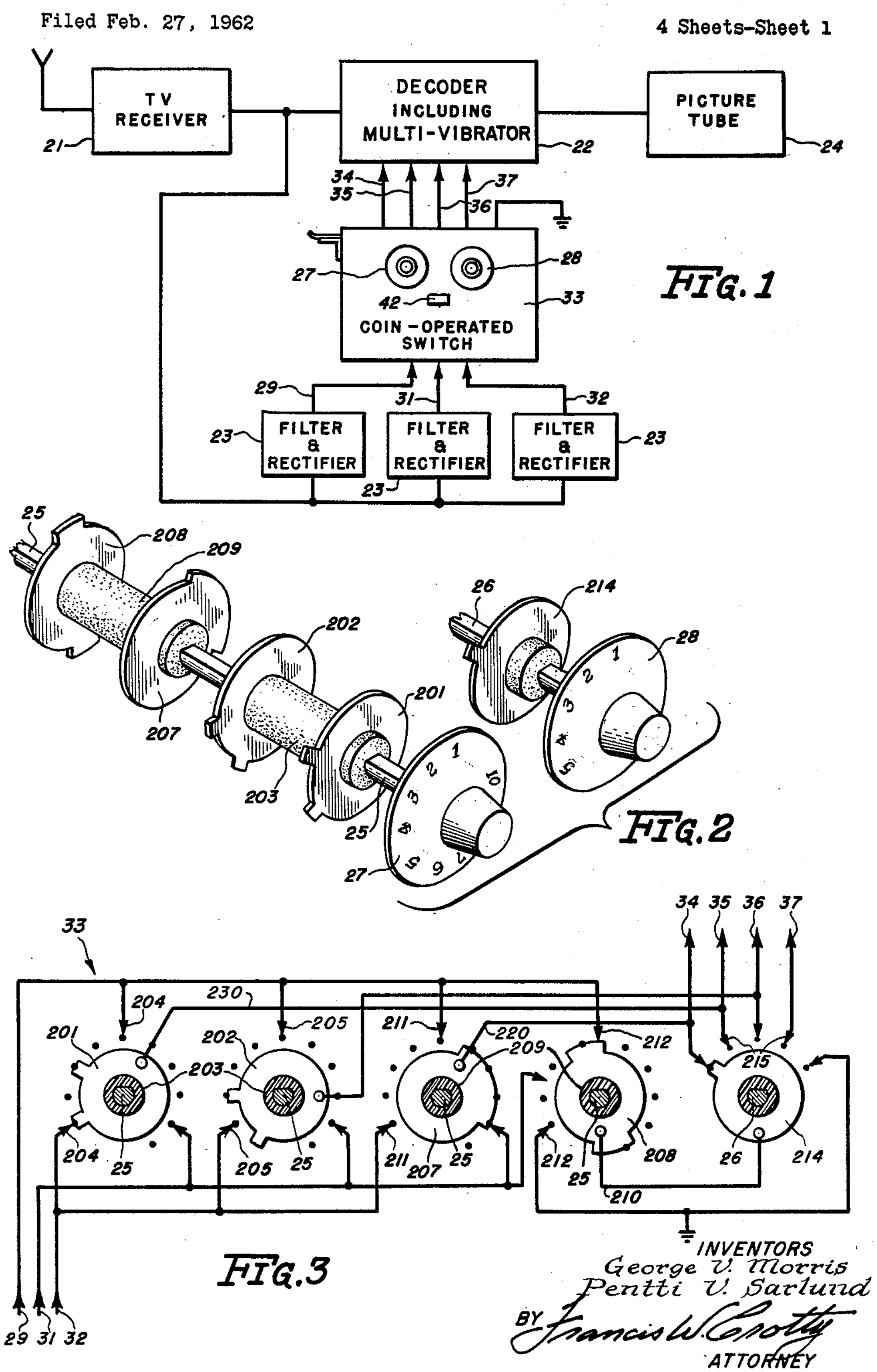
FIGURE 1 is a block diagram of a subscription television receiver embodying a decoding apparatus constructed in accordance with the present invention.
FIGURE 2 is an exploded perspective view of certain circuit switching elements employed in the decoder of FIGURE 1.
FIGURE 3 is a diagrammatic circuit detail of a wiring arrangement employed in the decoding apparatus.

The subscription television receiver represented in FIGURE 1 is for use in a system in which intelligence or program signals, coded in accordance with a predetermined code schedule, are broadcast for use solely by authorized subscribers. Coding of the program or video signal may take any of a variety of known forms. An effective and relatively simple type of coding features changing the time relation of the synchronizing and video frequency components of the composite television signal from time to time, that is to say, the synchronizing information may have one time relation with respect to video in one operating mode but have a specifically different time relation with respect to video in another mode and the transmission is changed from one mode to the other in accordance with a coding schedule which, preferably, is random in nature, for the purpose of providing greater security.

It is essential in this class of system that certain information be transmitted or otherwise made available to subscribers in order that they may establish the same code sequence as in the transmission, in order to effect decoding. It has been proposed that decoding signal components be included in the broadcast and that such signals be in themselves coded requiring that they be read or translated at a receiving station in order to derive from them information concerning the code in use. An example of such transmitted decoding information is described and claimed in copending application, Serial No. 326,107, described above. In this system bursts of signal energy are transmitted during the retrace intervals of the television signal. Each code burst has a particular frequency assignment and may be separated at the receiver by frequency-selective circuits.

Having separated the code signal bursts from one another, they may be employed to actuate a multivibrator or other signal generator to develop a decoding signal having a waveform governed entirely by the schedule represented by the code signals. So long as the decoding signal formed in this fashion at the receiver is identical to the signal representing the coding schedule of the transmitter, it is possible to effect decoding of the coded transmission.

It will be assumed that the receiver of FIGURE 1 is to be employed in this type of environment and, for the sake of simplicity, it will be further assumed that the coding signals included in the broadcast are three bursts of different coding frequencies.

A receiving mechanism for utilizing a transmission of the type described includes the usual receiver circuits 21 comprising a tunable radio-frequency amplifier, a first detector or oscillator-modulator, suitable stages of intermediate-frequency amplification and a second or video detector. The input terminals of units 21 connect with an antenna system as indicated and the output terminals connect through a decoder 22 to a picture tube and controlling circuitry represented in block form at 24. The control circuitry for the picture tube comprises such components as the synchronizing signal separator which separates the synchronizing from the video frequency information of the received signal, line and field-scanning systems synchronized by received information in order that properly timed deflection signals may be supplied to the picture reproducer, and, generally, an automatic gain control supply included with the synchronizing-signal separator. The AGC potential controls the gain of the radio-frequency and intermediate-frequency amplifiers to maintain the signal level at the video detector within a relatively narrow range of amplitude variations in spite of much wider variations in received signal intenstiy.

Obviously, decoder 22 is included in the video channel of the receiver and for the type of scrambling or coding that is here assumed, that is, one in which the time relation of the video and synchronizing components changes from time to time, it may advantageously be of the form described and claimed in Patent No. 2,758,153. Such a decoder includes a beam-deflection tube having a pair of anode segments and the video channel extends through the tube to the instantly active anode-segment. A time-delay network is connected in series with one such anode segment so as to introduce a compensating change in video relative to synchronizing information in synchronism with mode changes of the transmission as required to accomplish decoding. Beam-deflection electrodes within the tube receive a decoding or actuating signal to control the displacement of the beam as between the two anode segments. For that purpose, unit 22 includes a multivibrator which, as it is switched between its two stable operating conditions, develops a deflection control signal for the beam deflection tube. Unit 22 may thus be considered as a decoder responsive to an applied control signal for decoding the received television signal.

Generation of control signals for application to the decoder is under the control of the decoding signal components included in the transmission. These signals are recognized and extracted from the received program signal by filter-rectifier units 23 which are connected to the output terminals of receiver circuits 21. Each such filter-rectifier unit is selective to one of the three frequencies employed for the decoding signal bursts. The filter-rectifiers are coupled over input conductors 29, 31 and 32 to the input terminals of a permutation switch device 33, constructed in accordance with the subject invention and arranged for coin actuation. The details of this device are shown in other figures of the drawings to be considered hereinafter. Suffice it to say here that device 33 permutes control or decoding pulses received over input conductors 29, 31 and 32 to the end that they appear in a particular order on output conductors 34, 35, 36 and 37, and by means of these output conductors they are routed in prescribed manner with respect to the input circuits of the multivibrator included within unit 22. A permutation device of this type is utilized at the transmitter to control coding of the program signal so that correspondence of the permutation at transmitter and receiver may accomplish decoding. The permutation is determined by two adjustment knobs 27, 28 of device 33 upon manipulation by a subscriber and is rendered effective upon the registration of the number of coins corresponding to the subscription fee for the program.

In considering the operation of the receiver, it will be understood that each subscriber is advised before the start of the program interval regarding the specific adjustment to be made of controls 27 and 28. The information to the subscriber also indicates the cost to the subscriber for the program so that by depositing coins in the amount of that cost in coin-controlled device 33 he establishes the necessary operating conditions between filter-rectifier units 23 and decoding mechanism 22. Specifically, adjusting knobs 27 and 28 as directed, and depositing the requierd amount in coins, causes the same permutation to be established at the receiver between input conductors 29, 31 and 32 and output conductors 34–37 as employed at a corresponding permutating device in the transmitter to the end that the decoder operates synchronously and in the proper sense to accomplish decoding.

Attention will now be focused on coin-control permutation device 33. This device has certain major components contributing necessary and desirable features for the convenience of the subscriber. Among its principal component parts are a gang switch mechanism for establishing the necessary routing between the input and output conductors, a coin register for conditioning the circuitry of the decoder upon the deposit of an appropriate amount of subscription fee, a sample or peep circuit permitting the subscriber to view a portion of the program while retaining his election to reject subscribing thereto and obtaining a refund of the deposited coins, a coin-deposition mechanism, and finally a reset arrangement for restoring all of the components to their rest condition when a program transaction has been completed.

*Gang-Switch Mechanism*

The three filtered and rectified decoding signals incoming over lines 29, 31 and 32 enter coin-operated switching unit 33 for routing over outgoing lines 34, 35, 36 and 37 to the multivibrator of unit 22. Accordingly, switch unit 33 is comprised of disc-type gang switches mounted on shafts 25 and 26, and having variously distributed contact sectors as portrayed in FIGURES 2 and 3. Contact discs 201 and 202 are secured to opposite faces of a common insulating wafer 203 supported on shaft 25 and their contacting sectors sweep a circumferential distribution of stationary contacts 204 and 205 mounted on opposing sides of a plate 206 shown in FIGURE 7. Contact discs 207 and 208, in like fashion, are carried on opposite faces of wafer 209, secured to shaft 25, and they sweep a series of contacts 211 and 212 disposed on opposed sides of a plate 213. Shaft 26 carries a single contact disc 214 having a single sector that sweeps across a series of five contacts 215 of a stationary insulating plate 68 as shown in FIGURE 5.

As is apparent from the illustrations in FIGURES 2 and 3, the angular orientation of contact discs 201–202, 207–208, and 214 determines whether or not any of their contacting sectors engages any of the stationary contacts 204, 205, 211, 212 and 215 respectively. In accordance with the engagement of such contact discs with their stationary contacts, circuit paths or routes are established between input conductors 29, 31 and 32 and output conductors 34–37. Discs 201, 202, 207 and 208 are rotatable simultaneously under the control of knob 27 through its shaft 25, while disc 214 is rotatable under the control of knob 28 through its shaft 26. Shaft 25 is capable of assuming ten different angular positions while its companion shaft 26 is capable of assuming only five different angular positions.

Figures 7, 8, 9:
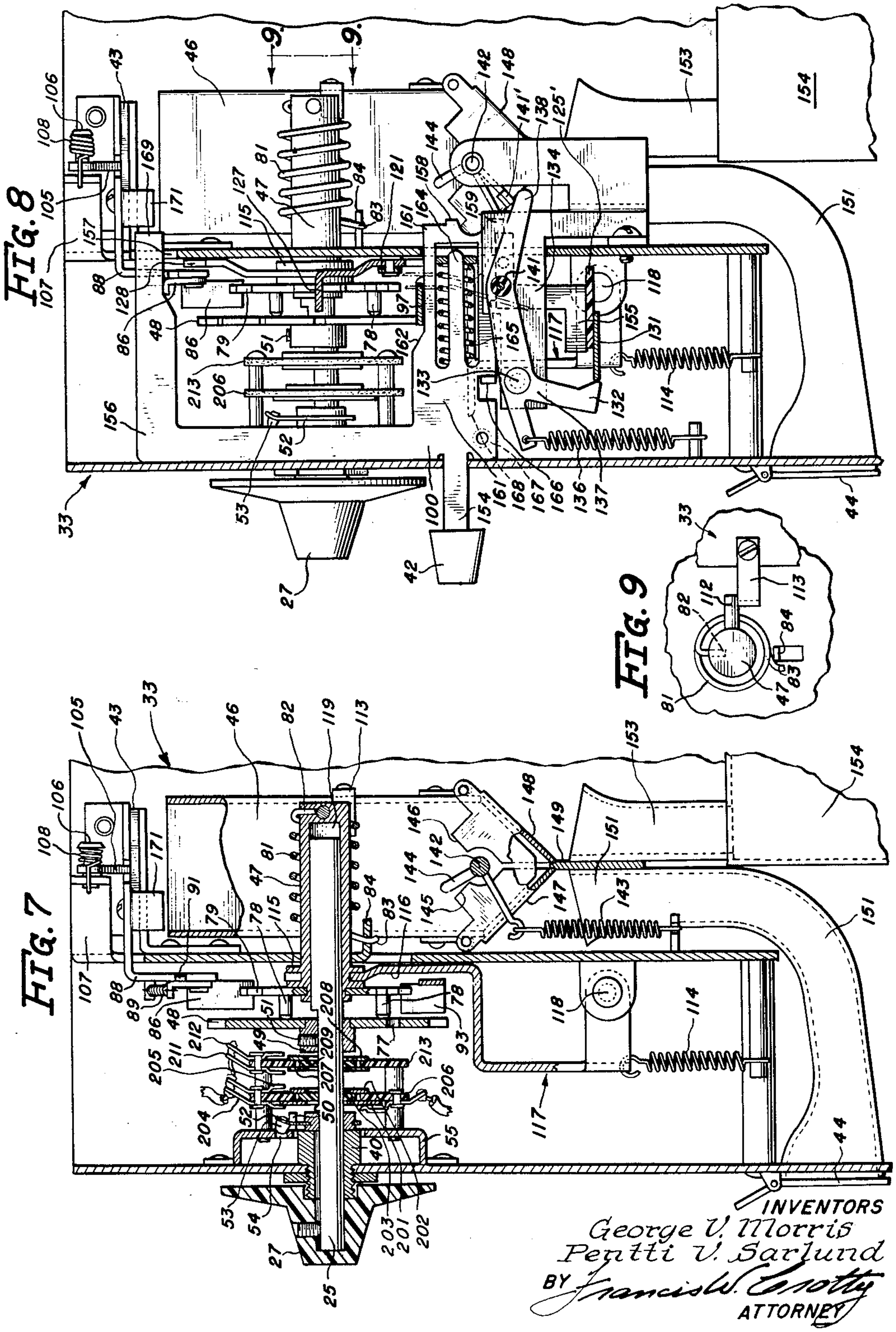
FIGURE 7 is a transverse sectional view taken approximately on line 7—7 of FIGURE 4.
FIGURE 8 is another transverse sectional view but taken approximately on line 8—8 of FIGURE 4.
FIGURE 9 is a fragmentary rear elevational view from a vantage designated in 9—9 on FIGURE 8.

Toward that end, shaft 25 is journaled in a bushing 40, FIGURE 7, and control knob 27 is secured to its free end. Its opposite end turns freely in a tubular housing 47 and, intermediate its ends, it carries a radially slotted indexing disc 48 having a collar 49 keyed to the shaft by a setscrew 51. The shaft is retained in any selected angular position by a spring tensioned detent arm 52 terminated in a ball detent 53 adapted to engage successively a distribution of ten apertures 54 circumferentially arranged in a stationary bracket 55 supported by the housing of unit 33. This bracket also supports insulating plates 206 and 213 which carry stationary contacts. Shaft 25 is thus manually adjustable in respect to ten operating positions each of which establishes a different permutation pattern of the contact sectors of discs 201–202 and 207–208 with respect to their associated stationary contacts 204–205 and 211–212. Successive positions of shaft 25 have an angular separation of thirty degrees and bracket 55 carries a pair of stop projections 50 (only one of which appears in FIGURE 7) disposed in the path of detent arm 52 to restrict the rotatable displacement of shaft 25 between them to a range of 270 degrees.

Figure 5:
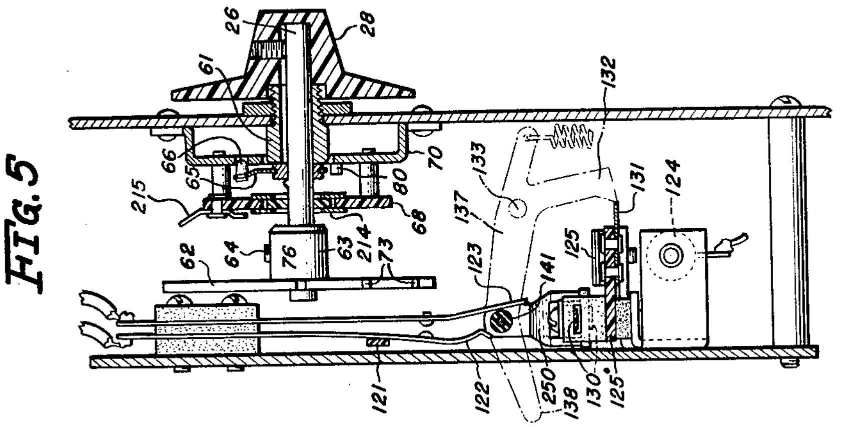
FIGURE 5 is a transverse sectional view taken approximately on line 5—5 of FIGURE 4.

In like fashion, shaft 26 is journaled in a bushing 61, FIGURE 5, and control knob 28 is affixed to one of its ends. There is a units integer indexing wheel or disc 62 secured by a hub 63 to a flat section at the other end of shaft 26 by a setscrew 64. This shaft is also provided with a springable detent arm 65 having a spherical termination 66 which may be received in any of five apertures formed along an arc within a bracket 70 secured to the housing of unit 33. Thus, for the embodiment under consideration, shaft 26 has five operating positions although it obviously may have a larger or smaller number of such positions. These positions have an angular separation of thirty degrees and a pair of stop projections 80 (only one appears in FIGURE 5) mounted on bracket 70 in the path of movement of detent 65 to restrict rotation of shaft 26 to approximately 120 degrees. In each position of shaft 26, contact disc 214 comes into electrical engagement with a different one of its five stationary contacts 215, four of which connect with output conductors 34–37 and the remaining one to ground. Shaft 26 is parallel and coplanar with shaft 25 and they support index discs 48 and 62 in coplanar and closely spaced relation.

The detenting of shaft 26 relative to that of shaft 25 is arranged to achieve a prescribed relation of index discs 48 and 62 rotated with these shafts. More particularly, disc 48 has a series of ten radial notches 72 while disc 62 has a series of five notches 73 and the detent arrangement is such that for every operating position of both shafts one of notches 72 is in horizontal alignment with one of notches 73 as illustrated in FIGURE 4. Indexing disc 48 is provided with one or more probe apertures 77, in the instant example three in number, for correlating the gang-switch mechanism to a coin-register mechanism.

*Coin-Register Mechanism*

The coin-register mechanism comprises a ratchet wheel 79 integrally associated with tubular housing 47. This wheel carries a number of probe projections 78 corresponding in angular and radial disposition to the apertures 77 of disc 48 to be received therein. The probe pins or projections 78 are urged toward disc 48 by a spring 114, considered hereinafter. A spiral torque spring 81, FIGURE 7, is coiled around housing 47 with one of its ends 82 imbedded in the housing and its other end 83 thrust against a projection 84 struck from the rear wall of the unit cabinet 33.

The ratchet wheel 79 has a circumferential distribution of teeth corresponding in angular spacing with that between notches 72 of disc 48. Rotation of ratchet wheel 79 clockwise, as viewed in FIGURE 4, is imparted in step-by-step manner by a feed pawl 86 pivoted at 87 on an arm 88 that extends sidewardly and downwardly, from a coin slide 43. A spring 89 urges pawl 86 in a counterclockwise direction and yieldably maintains the pawl against a stop shoulder 91 struck from arm 88.

Coin slide 43 is shiftable from a normal or rest position portrayed in FIGURE 4 to a fully actuated position, displaced rightwardly therefrom, to advance pawl 86 and rotate ratchet wheel 79 one tooth distance. During the return stroke of coin slide 43, pawl 86 yields under its spring 89 deflecting slightly clockwise as it overrides a succeeding tooth of ratchet wheel 79 in readiness for a subsequent actuation. Reverse movement of ratchet wheel 79 is normally prevented by a latching pawl 93 pivoted at 94 and urged clockwise by a spring 95. A sidewardly extending shelf 97 of pawl 93 rests on the top surface 161 of a reset member 100, FIGURE 8, so that displacement of member 100 cams pawl 93 out of engagement with ratchet wheel 79 permitting reverse movement thereof during reset.

Figure 6:
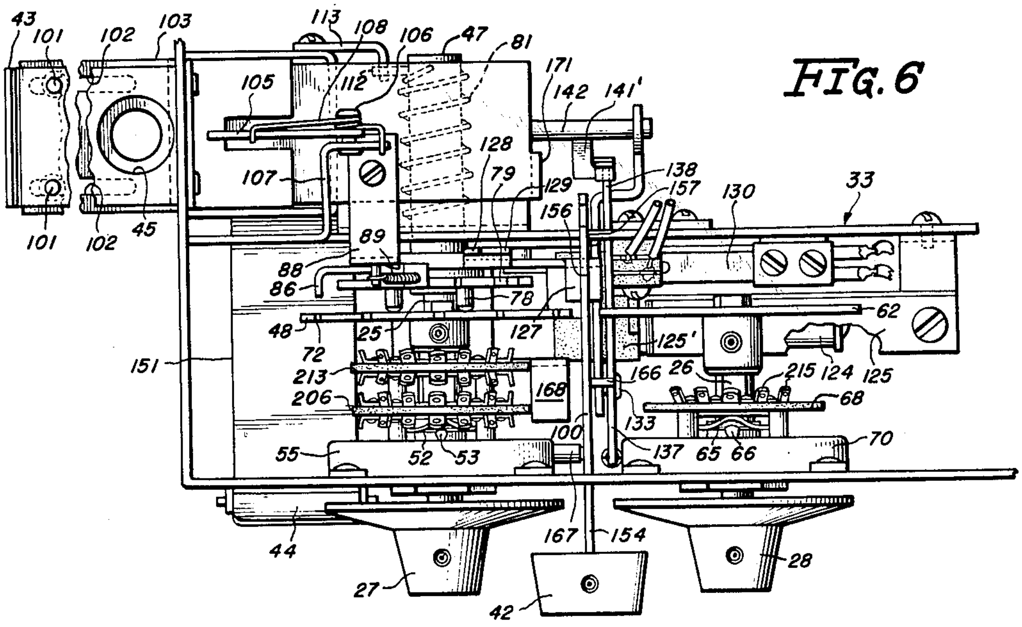
FIGURE 6 is a plan view with certain portions broken away of the switching apparatus shown in FIGURES 4 and 5.

Coin slide 43 is guided in its motion by a pair of headed pins 101 carried thereby, FIGURE 6, and riding in slots 102 formed in a support bracket 103 secured to the enclosure casing of unit 33. A coin-receiving aperture 45 is provided in slide 43 for the reception of a coin of predetermined size which fills the space of the aperture. A coin sensing arm 105 is pivotally supported at 106 in a bracket arm 107 integral with the frame. A torque spring 108 biases arm 105 counterclockwise to urge a shouldered extremity 109 thereof into engagement with slide 43.

Accordingly, if slide 43 is moved to the right without a proper coin having been placed into aperture 45, shoulder 109 enters aperture 45 prior to completion of the full stroke of the slide and prevents completing that stroke. Under such conditions, ratchet wheel 79 is not advaced a step by pawl 86. Of course, displacement of the coin slide with the proper coin in aperture 45 does cause pawl 86 to advance ratchet wheel 79 one step for each stroke of the coin slide. Moreover as each movement of coin slide 43 is completed, coin aperture 45 passes beyond sensing arm 105 to a discharge position where the entrapped coin is released and falls into a transient coin-storage receptacle 46.

Rotation of ratchet wheel 79 in step-by-step manner and corresponding rotation of housing 47 to which the wheel is affixed winds up torque spring 81 and stores energy therein. This step-by-step rotation of ratchet disc 79 is done by successive insertions of a number of coins or coin tokens in the coin receiving slide 43 followed by slide movements thereof.

When the proper number of coin deposits have been made, ratchet wheel 79 will have been advanced to a position whereat probe pins 78 come into alignment with holes 77 of index disc 48. Thereupon, pins 78 enter such holes under the impetus of spring pressure exerted by a test lever 117.

The lever 117 is best seen in FIGURES 7 and 8. It is pivotally supported at 118 and is urged counterclockwise by a spring 114. The forward end of housing 47 is provided with an enlarged collar 115 having an annular groove for receiving a yoke or bifurcated terminus 116 of lever 117. Counterclockwise rotation of lever 117 about its pivot 118 is but a small angular movement. Enough clearance space 119 is provided within housing 47 to allow for this movement. Counterclockwise rotation of lever 117 is normally prevented because pins 78 are misaligned with apertures 77 of disc 48 except when the correct number of coins has been registered, as described. The semi-spherical ends of pins 78 glide over the surface of disc 48 while the step-by-step coin deposit operation is conducted.

Axial movement of housing 47 as pins 78 enter apertures 77 locks the index mechanism against further movement until the apparatus has been reset for another program selection. This protects the subscriber against the possibility that the control knobs 27 and 28 may be tampered with before completion of the program interval, requiring the deposit of additional coins in order that the mechanism may be reconditioned to permit viewing the remainder of the program. Referring to FIGURE 4, it is seen that a portion 126 of lever 117 carries a horizontally extending latch member 127. It is positioned at the same horizontal level as the aligned contiguous slots 72 and 73 of index discs 48 and 62 respectively, and it is wide enough to enter both slots as lever 117 and sleeve 47 are advanced to register pins 78 with apertures 77. Obviously, index discs 48 and 62 are rendered immovable by the intervention of latch 127.

At the same time and as an incident to locking the index discs, coin slide 43 is locked in its actuated position when the final coin has been registered and lever 117 has been shifted. This is desirable because it prevents inserting more coins then the program costs. It is accomplished by a blocking extension 128 of one tine 129 of the bifurcation 116 provided on lever 117. Normally, extension 128 is clear of the path of movement of bracket 88, carried by coin slide 43, and the bracket passes freely to either side of the extension as the coin slide is reciprocated between its rest and its fully operated positions. At the time the final coin is registered, however, bracket 88 is disposed to the right of extension 128 and this extension moves into the return path of bracket 88 as probe pins 78 enter apertures 77. In this manner, the return of the coin slide 43 to its rest position is arrested pending resetting of the apparatus.

It should be noted in passing that the movement of lever 117 and housing 47 does not release spring 81 because latch pawl 93 is wide enough to permit such movement while retaining its locking relation to ratchet wheel 79. However, this movement of sleeve 47 and lever 117 does condition decoder 22, electrically, for operation by completing its power supply circuit and also prepares a sampling or peep circuit to afford the subscriber an opportunity to witness a sample of the program before obligating himself to subscribing to it. The term "operative interconnection" is used herein in a generic sense and is intended to include a finalizing step or completion of a selectable circuit path which is partially prepared as by the setting of switch controls, as well as one in which the selectable circuit path is actually completed by the control setting but is not rendered effective until some supervision is made, external to the permutation switch device, as for example supplying power to the decoder unit as herein disclosed.

*Sample or Peep Circuit*

A block of insulation 121, FIGURES 4 and 5, carried upon lever 117 is thrust forward, closing a pair of normally open contacts 122 and 123, when this lever is moved to register pins 78 with apertures 77. The closure of contact pair 122 and 123 completes a local circuit (not shown) which includes, in series, a heater element 124 and the power supply of decoder 22. This initiates a timing function under the control of a bistable, thermostatic type of device 125 and also introduces electrical power for the decoder. Heater 124 is disposed in close juxtaposition to and beneath bimetallic element 125 whose cold or starting position is portrayed in FIGURE 4. The time necessary to distort element 125 by heat from heater 124 in order to place it into its ultimate position corresponds with a predetermined sampling or peep period. In other words, the duration of the peep interval is that period of time between the closing of contact pair 122–123 and the full distortiton of element 125 compelled by the heat from heater 124. During this interval, the decoded image is reproduced by image reproducer 24 for observation and the subscriber is able to elect whether to view the program or not. If he elects not to see the program, he operates a reset mechanism, to be described hereinafter, and the coins which were deposited to initiate the sampling period are returned and the decoder is deenergized interrupting reproduction of the decoded program. If the subscriber does not reject the program, within the peep interval, element 125 causes the decoding apparatus to lock up for the program interval and also conditions the apparatus for collection of the deposited coins.

These functions are accomplished by the cooperation of element 125 and a three-armed lever 137, pivoted at 133 as shown in FIGURES 10–12. During the sampling or peep interval, element 125 is out of engagement with a leaf spring 131 which is in the position best portrayed in full-line construction in FIGURE 12. In this condition, leaf 131 engages arm 132 of three-arm lever 137, restraining it against the bias of a spring 136. After the expiration of the peep interval, bimetallic element 125 deflects blade 131 downwardly to the broken-line position, permitting lever 137 to rotate counterclockwise under the urge of a spring 136 and elevating its arm 138 to the position shown in FIGURE 11. Also an L-shaped insulating switch operator 125' carried on leaf spring 131 is depressed to close a second pair of contacts 130, electrically in parallel with contact pair 122 and 123. For this purpose, the vertical section of insulation 125' is apertured and one end of the movable contact of pair 130 projects therethrough. This maintains the aforedescribed local circuit to heater element 124 and to the power supply of the decoder so long as the heater remains energized.

At the same time, a spread bushing or pin 141 of insulating material carried by arm 138 and interposed between the divergent ends of contact springs 122 and 123 opens this contact pair notwishstanding that they are urged closed by insulation strip 121. However, this does not result in opening the local circuit because of the closure of contact pair 130. A stirrup 250 carried by the spread bushing 141 includes a lowermost transverse portion which is disposed above the bottom leaf of contact pair 130. During the latched condition of three-arm lever 137, FIGURE 8, this portion of stirrup 250 depresses the bottom leaf as shown in FIGURE 4, but as soon as lever 137 is released, FIGURE 11, this leaf is freed to assume a position whereas it may be engaged by the top leaf when the latter is operated by the insulation piece 125. It is noteworthy that the herein disclosed timing device, for affording the described peep interval, possesses the advantage over other classes of tolling instrumentalities that in the event of momentary power failure, following the expiration of the timing cycle, no loss of effective decoding connection is suffered because the bimetal 125 keeps the power supply circuit closed at contact pair 130 for a substantial period of time. Since most conditions of power failure are instances of but small time duration this teaching safeguards the subscriber from having to reinstate the operative interconnection and make another fee payment for the same program.

Accordingly, for the described conditions, the received signal is decoded and reproduced for the enjoyment of the subscriber. Since, as explained above, the subscriber has an election to view the picture or not, but must first deposit coins in order to exercise that election, the coin disposition mechanism is arranged to make a refund or a collection.

*Coin Disposition Mechanism*

As previously described, a certain number of coins are deposited within a storage area 46 as the switch apparatus is operated to accomplish decoding of a given program. The disposition of such coins is, of course, dependent upon the decision of the subscriber in the matter of whether or not the program will be viewed. If the program is rejected seasonably the coins are to be returned to the subscriber; otherwise they are to be collected or to be deposited for collection. Accordingly, coin storage compartment 46 may discharge into a chute 151 leading to a coin return door 44 or, alternatively, may discharge into a chute 153 leading to a locked collection compartment 154, see FIGURE 7.

Both chutes are normally closed by a pair of inclined doors 147 and 148, pivoted to side walls of compartment 46 and spring loaded to closed position against a divider plate 149. A transverse shaft 142 extending within compartment 46 carries an operating lever 144 which may be brought to bear against a projecting surface 145 of door 147 or like surface 146 of door 148 to operate the doors selectively depending upon the rotation of shaft 142.

This shaft may be rotated upon actuation of a reset mechanism, presently to be described. Suffice it to say at this junction that the free end of shaft 142 carries a striker 141', FIGURE 6, for engagement by either of two surfaces 158, 159 of a slidable portion 161 of a reset lever. Throughout the aforementioned peep interval, a weak bias spring 143 retains striker 141' in the position represented in FIGURE 8 in which advancement of reset lever 161 brings its surface 159 to bear against the striker and force operator 142 against projection 145 to open door 147. This condition is illustrated in FIGURE 10. Upon termination of the peep interval, however, lever 137 rocks counterclockwise about its pivot 133 as aforedescribed and elevates arm 138. That arm is in the path of and beneath striker 141 so that as it rotates, the striker is displaced clockwise against its spring 143 to the position shown in FIGURE 11. In this position, the striker is in the path of surface 158 of the reset lever 161 so actuation of the reset forces operator 142 against projection 146 to open door 148.

It is now expedient to consider the reset mechanism in greater detail.

*Reset Mechanism*

The reset mechanism includes a button 42 mounted on one arm 154 of a slidable member 100 whose operation from the position shown in FIGURE 8 to that shown in FIGURE 10 produces several results. Member 100 includes an extension arm 156 that ranges first upwardly then sidewardly passing through a guide notch 157 in the rear wall of housing 33. The free end 169 of arm 156 is advanced across the path of a depending section 171 of the coin slide upon actuation of reset button 42. This retains the coin slide in its actuated position until the return stroke of the reset button even though the locking engagement of projection 128 of lever 117 with bracket 88 is released as an incident to the advancement of reset button 42. Directly opposite arm 154 is another arm 161 of member 100 that terminates in the two projections 158 and 159 between which is a cutaway or valley 160 allowing projections 158 and 159 to pass beyond shaft 142 when member 100 is operated as best illustrated in FIGURE 10.

Arm 161 has a top edge of two different elevations between which is a sloping cam surface 162 for releasing latch lever 93 by rotating its end portion 97 counterclockwise. This prepares ratchet wheel 79 for return to its zero or reference position. Arm 161 has a generally U-shaped cutout as best discernible from FIGURES 10, 11 and 12. This U-shaped cutout provides a forwardly extending tongue 164 which serves as a guide and support for a restoring spring 165 coiled about it and pressing against the adjacent surface of the rear wall of unit 33. A horizontally disposed lug 166 at the lower edge of member 100 extends across the top of arm 138 of lever 137 so that during reset, lug 166, opposing spring 136, moves along the top edge of arm 138 and thereby returns lever 137 from the position shown in FIGURE 11 to that of FIGURE 10. On resuming its reset condition, the stirrup 250, carried by spread bushing 141 of three-arm lever 137 engages with its transverse portion the bottom leaf of contact pair 130 and thereby the interconnection circuit to heater 124 and the power supply for decoder 22 is opened.

A horizontal pin 167, FIGURES 8 and 10, is secured to member 100 at a level for engaging the undersurface of a projection 168 of lever 117, to cam lever 117 to its original position, rocking it clockwise about pivot 118 in opposition to spring 114. This restores lever 117 to its normal position in which it is portrayed in FIGURE 7, shifting sleeve 47 rightwardly and with it ratchet wheel 79. As a result, the probe pins 78 carried by ratchet wheel 79 are withdrawn from the probe apertures 77 in disc 48 and thereupon the energy, for restoring ratchet wheel 79 and sleeve 47, stored in coil spring 81, is permitted to take effect. Ratchet wheel 79 may now return counteclockwise as viewed in FIGURE 4 to its zero position, latch lever 93 having been meanwhile released due to the camming surface 162 on arm 166 of reset slide 100. Because probe pins 78 are no longer in alignment with apertures 79, lever 117 is restrained from returning to its actuated position so that as a further consequence, blocking projection 127 is withdrawn from engagement with a certain pair of radial notches 72 and 73 in discs 48 and 62 thereafter permitting these discs together with their shafts 25 and 26 to be rotated to a new setting. As a further consequence, coin slide 43 which had been locked in its fully actuated condition following the insertion of the last coin which satisfied the coin demand by the blocking extension 128 of tine 129 of the bifurcation 116 but in its stead coin slide 43 is now latched by the intervention of extremity 169, FIGURE 8, of arm 156 of the reset slide 100, preventing the return of coin slide 43 pending the restoration of reset 100 by its return spring 165.

If the reset occurs after the sampling interval, it is desirable to delay the return stroke of the reset mechanism until bimetallic element 125 cools and returns from its broken-line to its full-line position in FIGURE 12. This delay is introduced by a Z-shaped element 155 which is gravitationally biased to assume its broken-line position in FIGURE 12. However, so long as reset member 100 remains in its rest position, element 155 is held thereby in its full-line position. As member 100 is advanced to its broken-line position at the start of reset, a notch 180 passes to the forward end of element 155, permitting this element to rotate counterclockwise and enter the notch. This locks and restrains member 100 in its forward position.

*Operation*

When a subscriber in possession of the described apparatus desires to prepare his television set for the reception of a subscription television program, he obtains decoding information in the form of a binary code comprised of two decimal integers. Such information may be dissiminated over a private link, or an open one; it may even be included with the program listing in the newspaper. The subscriber adjusts the channel selector of his receiver to tune in the appropriate television channel and positions dials 27 and 28 in accordance with the tens and units integers, respectively of the binary code information.

Adjustment of these dials orients contact discs 201–202, 207–208 and 214 with respect to their associated stationary contacts 204, 205, 211, 212 and 215 and establishes a particular permutation or routing of input conductors 29, 31 and 32 relative to output conductors 34–37. Obviously, the switch mechanism 33 is capable of establishing a family of such permutations and the one selected by manipulation of knobs 27 and 28 in accordance with the received decoding information is that required to effect decoding of the program in question.

A representative permutation resulting from manipulation of knobs 27 and 28 is represented in FIGURE 3.

The applied control signals developed from the three variable frequency signal bursts enter the permutation switch device 33 over lines 29, 31 and 32 respectively. In accordance with the positions of shafts 25 and 26 as herein portrayed, the signal impulse over line 29 is translated through contact 212 of contactor 208, thence over collector line 210 to contactor 214 exiting over outgoing line 34 to the decoder 22. The control signal entering over line 31 is routed over a contact of contactor 207, thence over collector circuit 220 and it too emerges over outgoing line 34. Finally, the control impulses incoming over line 32 is carried through fixed contact 204 of contactor 201 to the collector circuit 230 and emerges over outgoing line 35.

Thus the applied control signals incoming over the three lines 29, 31 and 32 are routed to decoder 22 in a characteristic manner over outgoing lines 34–37. This effect is the result of a permutation pattern resolved by the particular circuit arrangement between the contacts 204, 205, 211, 212 and 215 as well as that between contactors 201, 202, 207, 208 and 214. Also, there may be achieved a family of permutational re-arrangements in respect to each circuit arrangement by variously positioning the integer shafts 25 and 26 and thereby choosing different routes over which the applied signals from input lines 29, 31 and 32 are directed to output lines 34–37.

The numerical value of the tens integer of a switch setting code informs the subscriber of the number of coins or tokens required to be deposited consecutively in slide 43 in order to satisfy the coin demand and turn on the power supply in his decoder 22. Each coin, in turn, is transported by coin slide 43 and deposited into coin storage compartment 46. Moreover, each actuation of the coin slide steps ratchet wheel 79 one step and winds up spring 81. When the proper number of coins have been deposited, coin slide 43 is latched in its actuated position by engagement of stop projection 128 of lever 117 with bracket 88 carried by the coin slide. This latching results from the fact that the step-by-step actuation of the coin slide brings probe pins 78 into alignment with holes 77 of index dics 48, permitting lever 117 to shift under the influence of spring 114. At this time contact pair 122–123 is closed by lever 117, closing the circuit of heater 124 and the power supply of the decoder. The subscriber's television receiver 41 now decodes and reproduces the received subscription program.

This initiates a prescribed peep or sample interval (three to five minutes) during which the subscription program may be viewed so that the subscriber may elect to accept or reject the program. If the program is to be rejected, reset button 42 is actuated.

As reset button 42 is advanced, cam surface 162 rotates end 97, FIGURE 8, of locking pawl 93 and withdraws the pawl from ratchet wheel 79 preparing the wheel for returning to its zero position. As a further consequence of continued displacement of the reset button, projection 159 of reset arm 161 strikes plate 141' and drives door operator 142 against projection 145 and opens door 147. This discharges the coins from compartment 46 down chute 151 to a refund door 44 where they may be recovered by the subscriber. At the same time, projection 167 of reset member 100 engages portion 168 of lever 117, returning it to its rest position. Contact pair 122–123 open, de-energizing heater 124 and the power supply of the decoder so that decoding ceases. Ratchet wheel 79 returns to its zero position because probe pins 78 are withdrawn from apertures 77 of disc 48, latch 128 releases bracket 88 of coin slide 43 and release of reset button 42 restores the entire mechanism to its rest position.

At the end of the peep interval element 125 has been sufficiently heated by heater 124 to assume a flexed condition, closing a pair of hold contacts 130 and releasing three-armed lever 137 from its latched position, FIGURE 10, to its released position, FIGURE 11. Closure of hold contacts 130 assures the continued energization of the power supply in decoder unit 22 as well as the continued heating of element 124 which preserves the described operating conditions until the heater circuit is subsequently opened and element 125 cools and returns to its normal, undeflected state. In other words, the receiver decodes the received subscription program during the peep interval and, unless the program is rejected by actuation of the reset within that interval, decoding continues throughout the program time because the circuit connections are maintained by hold contacts 130.

The assurance of power supply by reason of contacts 130 prevails even as against conditions of power failure if such failures do not extend for periods longer than the timing cycle. Statistically, most power failures are of a brief and transient nature hence the herein provided timing device effectively prevents loss of program services to subscribers when their local power supply is interrupted.

The displacement of lever 137 opens the initially closed contact pair 122–123 by means of switch operator 141 which engages contact blade 123, FIGURE 5. At the same time arm 138 of lever 137, engages and rocks an arm 141' of shaft 142 to the position shown in FIGURE 11. This places arm 141' in the path of projection 158 of reset arm 161 so that actuation of the reset causes door opener 142 to strike projection 146 and open door 148 which leads to chute 153 and the coin collecting container 154. Obviously, reset button 42 is not, under the described circumstances, operated until after the program interval.

As reset button 42 is advanced, latching pawl 93 is cammed away from ratchet wheel 79 by cam section 162; arm 156 moves into the path of trailing portion 171 to hold coin slide 43 in its actuated position; lever 117 is restored to its normal position; door 148 opens to transfer coins from compartment 46 to depository 154; and, finally, projection 166 of reset member 100 rotates lever 137 in a clockwise direction preparatory to restoring that lever to its normal position, FIGURE 8. Rotation of lever 137 causes switch operator 250 to depress the lower one of contact pair 130, opening the circuit of heater 124 and the power supply of the decoder. The return of lever 117 to its normal position retracts probe pins 78 from apertures 77 of disc 48 and permits spring 81 to rotate ratchet wheel 79 to zero position; stop projection 128 releases bracket 88 but coin slide 43 remains latched by member 156; and switch operator 121 is withdrawn from contact 122 to assure that the power supply of decoder 22 and heater 124 remains open.

When reset member 100 reaches its fully actuated position, Z-lever 155 turns about its pivot so that its end 159, FIGURE 12, enters notch 180 of member 100 and prevents the return of member 100 by its spring 165. This condition prevails only for a brief period of time, comparable to the sampling interval. Thereafter when bimetallic element 125 cools, leaf spring 131 resumes its elevated position, insulated pad 125' rocks lever 155 out of notch 180, and spring 165 instantly effects restoration of reset member 100 to rest position indicated in FIGURE 8. Concurrently, coin slide 43 returns to its normal position shown in FIGURE 4. Also, lever 137 is freed by the return stroke of member 100 to resume its normal position shown in FIGURE 4.

By way of summary, decoder 22, with its multivibrator for developing a beam-deflection signal, is responsive to an applied control signal for decoding the received subscription broadcast which is in the form of a coded composite video signal. The gang switches secured to shafts 25 and 26 constitute means, including a plurality of adjustable code-determining elements, for developing code signals for application to the decoder. The adjustable code-determining elements, of course, are the discs supported on such shafts and provided with contact sectors for selectively engaging associated stationary contacts. Their relation relative to the stationary contacts determines the code pattern established at the receiver and the adjustment of the code-determining elements, in response to the information given to the subscriber to establish the appropriate setting of control knobs 27 and 28, relates the code pattern to the schedule of the telecast. Collectively the code-determining elements constitute an adjustable code-determining apparatus.

Unit 33 is a coin-operated device having a coin-receiving member or slide 43 and a coin-collecting receptacle 46. This device further has a coin register, specifically index disc 48, coupled to the gang switches constituting the code-determining elements for registering a particular coin demand related to the adjustment of such elements. Specifically, the disc has several operating positions and it is stepped from one to the next as control knob 27 is turned. Thus, there is a direct relationship between the adjustment of knob 27 and this coin-demand register. When the coin demand is satisfied, namely when a proper number of coins is inserted into the coin register, device lever 117 responds by a movement that provides a control effect which establishes an operative connection between the control signal developing means 23 and the decoder 22 for application of the control signals thereto. Accordingly, lever 117 and the mechanical and electrical elements actuated in response to its movement constitute means responsive to the insertion of the required number of coins satisfying the demand registered by index 48 for establishing an operative interconnection from the gang switches to the decoder to enable decoding of coded intelligence signals.

The described device has many attractive features provided both for the convenience and safeguard of the subscriber. For example, latching tongue 127, which locks the code-determining elements in position once the proper conditions have been established for decoding, precludes inadvertent manipulation of the code-determining elements during the reception of a subscription program. This is highly desirable because other devices suffer the defect that manipulation of the code determining elements within the subscription interval requires the deposit of a second subscription fee to re-establish the necessary decoding conditions.

The sampling or "peep" provision is especially beneficial in that a subscriber is permitted to view a program to determine his interest therein before committing himself to the obligation of subscribing. Should a sample program not appeal or if, for any other reason, the subscriber decides within the sampling interval that he does not choose to accept the program, the operation of reset 42 returns the coins that had been deposited to condition the apparatus for the purposes of giving the subscriber a peek.

Of course, while the communication receiver of the invention has been shown in the environment of a subscription television receiver of the type wherein the intelligence or television signal is received over the air and is coded or scrambled, the invention is certainly not so restricted. Obviously, part or all of the television signal may be conveyed from the transmitter to the receiver via a coaxial cable or other closed circuit. Moreover, the television signal may be conveyed in conventional, uncoded form. A simple gate circuit, blocking device, or disabling means of any kind may be interposed in the receiver prior to the picture tube in order to prevent intelligible reproduction until the code-determining apparatus has been properly set up.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. A communication receiver for utilizing a received intelligence signal comprising:

means including an adjustable code-determining apparatus, to be adjusted in accordance with a predetermined adjustment, for developing a control signal having a waveform dependent upon the instantaneous adjustment of said code-determining apparatus;

means for utilizing said control signal to effect intelligible reproduction of said intelligence signal;

and means at least partially controlled by said code-determining apparatus for registering a particular charge in an amount determined by the instantaneous adjustment of said code-determining apparatus.

2. A communication receiver for utilizing a received intelligence signal comprising:

means including an adjustable code-determining apparatus, to be adjusted in accordance with a predetermined adjustment, for developing a control signal having a waveform dependent upon the instantaneous adjustment of said code-determining apparatus;

means for utilizing said control signal to effect intelligible reproduction of said intelligence signal;

means at least partially controlled by said code-determining apparatus for registering a particular charge in an amount determined by the instantaneous adjustment of said code-determining apparatus;

a controlled device;

and means coupled to said code-determining apparatus for establishing said controlled device in a predetermined operating condition during operating intervals in which said code-determining apparatus is adjusted in accordance with said predetermined adjustment.

3. A communication receiver for utilizing a received intelligence signal comprising:

signal-generating apparatus, including a plurality of adjustable code-determining elements to be adjusted in accordance with a predetermined adjustment, for developing a control signal having a waveform determined, at least in part, by the instantaneous adjustment of said code-determining elements;

means for utilizing said control signal to effect intelligible reproduction of said intelligence signal;

and means at least partially controlled by said signal-generating apparatus for registering a particular charge in an amount determined by the instantaneous adjustment of said code-determining elements.

4. A communication receiver for utilizing a received intelligence signal comprising:

a plurality of input circuits;

a plurality of output circuits;

a plurality of adjustable code-determining switches for collectively establishing different ones of a multiplicity of different inter-connection patterns between said input and output circuits in accordance with the instantaneous positions of said switches;

means including said input and output circuits and said switches for developing a control signal having a waveform dependent upon the instantaneous adjustment of said switches;

and means at least partially controlled by said code-determining switches for registering a particular charge in an amount determined by the instantaneous adjustment of said code-determining switches.

5. A communication receiver for utilizing a received intelligence signal comprising:

means including an adjustable code-determining apparatus, to be adjusted in accordance with a predetermined adjustment, for developing a control signal having a waveform dependent upon the instantaneous adjustment of said code-determining apparatus;

means for utilizing said control signal to effect intelligible reproduction of said intelligence signal;

means at least partially controlled by said code-determining apparatus for establishing a coin demand in an amount determined by the instantaneous adjustment of said code-determining apparatus;

and means responsive to a coin deposit for acknowledging said coin demand.

6. A communication receiver for utilizing a coded intelligence signal, comprising:

a decoder for decoding said coded intelligence signal;

means, including a plurality of adjustable code-determining elements, for developing a control signal having a waveform determined, at least in part, by the instantaneous adjustment of said code-determining elements;

means for utilizing said control signal to actuate said decoder;

and means at least partially controlled by said code-determining elements for registering a particular charge in an amount determined by the instantaneous adjustment of said code-determining elements.

7. A communication receiver for utilizing a coded intelligence signal, comprising:

a decoder;

means, including a plurality of adjustable code-determining elements, for developing a control signal having a waveform determined, at least in part, by the instantaneous adjustment of said code-determining elements;

means for utilizing said control signal to actuate said decoder;

a coin-operable device at least partially controlled by said code-determining elements for registering a coin demand in an amount determined by the instantaneous adjustment of said code-determining elements;

and means responsive to satisfying said coin demand for effectively enabling said decoder to decode said coded intelligence signal.

8. A communication receiver for utilizing a received intelligence signal comprising:

means including an adjustable code-determining apparatus, which must be adjusted in accordance with a given adjustment before said intelligence signal may be intelligibly reproduced, for developing a control signal having a waveform dependent upon the instantaneous adjustment of said code-determining apparatus;

means for utilizing said control signal to effect intelligible reproduction of said intelligence signal;

means operable subsequent to the adjustment of said code-determining apparatus for registering a particular charge in an amount determined by the instantaneous adjustment of said code-determining apparatus;

and means operable subsequent to the adjustment of said code-determining apparatus for releasably locking said code-determining apparatus against further adjustment.

9. A communication receiver for utilizing a coded intelligence signal, comprising:

a decoder for decoding said coded intelligence signal;

means, including a plurality of adjustable code-determining elements, for developing a control signal having a waveform determined, at least in part, by the instantaneous adjustment of said code-determining elements;

means for utilizing said control signal to actuate said decoder;

means at least partially controlled by said code-determining elements for registering a particular charge in an amount determined by the instantaneous adjustment of said code-determining elements;

and means operable subsequently for preventing adjustment of said code-determining elements.

10. A communication receiver for utilizing a received intelligence signal comprising:

means including an adjustable code-determining apparatus, to be adjusted in accordance with a predetermined adjustment, for developing a control signal having a waveform dependent upon the instantaneous adjustment of said code-determining apparatus;

means for utilizing said control signal to effect intelligible reproduction of said intelligence signal;

means at least partially controlled by said code-determining apparatus for establishing a coin demand in an amount determined by the instantaneous adjustment of said code-determining apparatus;

means responsive to a coin deposit for acknowledging said coin demand;

and coin-lockout means responsive to acknowledgement of said coin demand for effectively preventing the deposit of additional coins.

11. A communication receiver for utilizing a received intelligence signal comprising:

means including an adjustable code-determining apparatus, to be established in a predetermined condition of adjustment, for developing a control signal having a waveform dependent upon the instantaneous adjustment of said code-determining apparatus;

means for utilizing said control signal to effect intelligible reproduction of said intelligence signal;

a coin-operable device at least partially controlled by said code-determining apparatus for registering a particular coin demand in an amount determined by the instantaneous adjustment of said apparatus;

and means responsive to satisfying said coin demand for providing a control effect.

12. A subscription television system for utilizing a received intelligence signal comprising:

means, including a plurality of adjustable code-determining elements, for developing a control signal having a waveform dependent upon the adjustment of said elements;

means for utilizing said control signal to effect intelligible reproduction of said intelligence signal;

a coin-operable device at least partially controlled by said signal-developing means for registering a particular coin demand in an amount determined by the adjustment of said code-determining elements;

and means responsive to satisfying said coin demand for providing a control effect.

13. A subscription receiver for utilizing a received intelligence signal coded in accordance with a predetermined code schedule, comprising:

a decoder responsive to an applied control signal for decoding said coded intelligence signal;

means, including a plurality of adjustable code-determaining elements, for developing a control signal for application to said decoder having a waveform dependent upon the adjustment of said elements and related to said code schedule and for displaying a coin demand in an amount also dependent upon the adjustment of said code-determining elements;

a coin-operable device coupled to said control-signal-developing means for registering said coin demand;

and means responsive to satisfying said coin demand for enabling said decoder to decode said coded intelligence signal.

14. A subscription television receiver for utilizing a received intelligence signal coded in accordance with a predetermined code schedule, comprising:

a decoder responsive to an applied control signal for decoding said coded intelligence signal;

means for receiving a decoding signal and for developing therefrom a control signal related to said code schedule;

a permutation switch device having input terminals coupled to said receiving means and output terminals coupled to said decoder and manually adjustable to any of a plurality of operating conditions each establishing a different permutation pattern for the application of said control signal to said decoder;

a coin-operable device at least partially controlled by said permutation switch device and responsive to a published adjustment of said permutation device for registering a particular coin demand determined by the condition to which said permutation device is adjusted;

and means responsive to satisfying said coin demand for enabling said decoder to decode said coded intelligence signal, whereby an assessment of subscription fees for the use of coded intelligence signals may be made on a scale corresponding to a characteristic of a published adjustment pertaining to said permutation device.

15. A subscription television receiver for utilizing a received intelligence signal, comprising:

a coin-operable device, including a coin-receiving member and a coin-collecting receptacle, for registering a particular coin demand determined by the subscription fee for the use of said intelligence signal;

a coin-refunding mechanism for selectively ejecting coins from said receptacle to a refund station;

means responsive to the insertion of a number of coins corresponding to said coin demand for providing a control effect;

and means for disabling said coin-refunding mechanism a predetermined time after providing said control effect.

16. A subscription television receiver for utilizing a received intelligence signal, comprising:

a coin-operable device for registering a particular coin demand determined by the subscription fee for the use of said intelligence signal;

means responsive to satisfying said coin demand for providing a control effect;

a timing device including an element movable between a starting position and an ultimate position under delayed response conditions;

means initiated by said control effect for compelling the movement of said element from its said starting position to its said ultimate position;

and means under the control of said element once it attains its ultimate position for holding said compelling means in its compelling condition over intervals significantly shorter in duration than the time periods consumed by the movement of said element between its said positions.

17. A subscription television receiver for utilizing a received intelligence signal, comprising:

a coin-operable device, including a coin-receiving member, a coin-collecting receptacle, and a coin-refunding mechanism for selectively ejecting coins from said receptacle to a refund station;

means responsive to the insertion of a number of coins into said coin operable device for providing a control effect;

a timing device responsive to said control effect for tolling a sampling interval of predetermined duration;

and means for disabling said coin refunding mechanism at the conclusion of said sampling interval.

18. A subscription television receiver for utilizing a received intelligence signal coded in accordance with a predetermined code schedule, comprising:

a decoder responsive to an applied control signal for decoding said coded intelligence signals;

means for developing a control signal for application to said decoder having a code pattern related to said code schedule;

a coin-operable device including, a coin-receiving member, a coin-collecting receptacle, and a coin-refunding mechanism for selectively ejecting coins from said receptacle to a refund station;

means responsive to the insertion of a number of coins into said coin receiving member corresponding to a subscription fee for effecting the application of a control signal from said control-signal-developing means to said decoder to decode said intelligence signal;

and means responsive to the actuation of said coin-refunding mechanism for effectively disabling said decoder to discontinue the decoding of said intelligence signal upon refunding of the inserted coins.

19. A subscription television receiver for utilizing a received intelligence signal, comprising:

a coin-operable device, including a coin-receiving member and a coin-collecting receptacle, for registering a particular coin demand realted to the subscription fee for the use of said intelligence signal;

a coin-refunding mechanism for selectively ejecting coins from said receptacle to a refund station;

means responsive to the insertion of a number of coins corresponding to said coin demand for providing a control effect;

a timing device responsive to said control effect for tolling a sampling interval of predetermined duration;

and means for maintaining said control effect and for disabling said coin-refunding mechanism at the end of said sampling interval.

20. A subscription television receiver for utilizing a received intelligence signal, comprising:

means, including a plurality of adjustable code-determining elements, for developing a control signal having a waveform dependent upon the adjustment of said elements;

means for utilizing said control signal to effect intelligible reproduction of said intelligence signal;

a coin-operable device, including a coin-receiving member and a coin-collecting receptacle, at least partially controlled by said control-signal-developing means for registering a particular coin demand in an amount determined by the adjustment of said code-determining elements;

and means responsive to the insertion of a number of coins corresponding to said coin demand for blocking said coin-receiving member against the reception of additional coins.

21. A subscription television receiver for utilizing a received intelligence signal, comprising:

means, including a plurality of adjustable code determining elements, for developing a control signal having a waveform dependent upon the adjustment of said elements;

means for utilizing said control signal to effect intelligible reproduction of said intelligence signal;

a coin-operable device, including a coin-collecting receptacle and a member movable from a coin-receiving position to a discharge position communicating with said receptacle, at least partially controlled by said control-signal-developing means for registering a particular coin demand in an amount determined by the instantaneous adjustment of said code-determining elements;

and means responsive to satisfying said coin demand for locking said coin-receiving member against movement.

22. A subscription television receiver for utilizing a received intelligence signal, comprising:

means, including a plurality of adjustable code-determining elements, for developing a control signal having a waveform dependent upon the adjustment of said elements;

means for utilizing said control signal to effect intelligible reproduction of said intelligence signal;

a coin-operable device at least partially controlled by said control-signal-developing means for registering a particular coin demand in an amount determined by the instantaneous adjustment of said code-determining elements;

and means responsive to satisfying said coin demand for locking said code-determining elements in their adjusted positions.

23. A subscription television receiver for utilizing a received intelligence signal coded in accordance with a predetermined code schedule, comprising:

a decoder responsive to an applied control signal for decoding said coded intelligence signal;

means, including a plurality of adjustable code-determining elements, for developing a control signal for application to said decoder having a waveform dependent upon the adjustment of said elements and related to said code schedule;

a coin-operable device at least partially controlled by said control-signal-developing means for registering a particular coin demand in an amount determined by the instantaneous adjustment of said code-determining elements;

means responsive to satisfying said coin demand for enabling said decoder to decode said coded intelligence signals and for locking said code-determining elements in their adjusted position;

and a reset mechanism for disabling said decoder, for wiping out said coin-demand register of said coin-operable device, and for unlocking said code-determining elements.

24. A subscription television receiver for utilizing a received intelligence signal, comprising:

means, including a plurality of adjustable code-determining elements, for developing a control signal having a waveform dependent upon the adjustment of said elements;

means for utilizing said control signal to effect intelligible reproduction of said intelligence signal;

a coin-operable device including a coin-demand register having a series of operating conditions individually representing a particular demand and at least partially controlled by said code-determining elements to assume an operating condition determined by the adjustment of said elements;

a coin collecting receptacle included in said device;

a member movable from a coin-receiving position to a discharge position communicating with said receptacle;

and a sensing device, coupled to said member and movable in step-by-step fashion thereby, for sensing the operating condition of said coin-demand register to provide a control effect in response to the deposit of a number of coins corresponding to the registered demand.

25. A subscription television receiver for utilizing a received intelligence signal, comprising:

a coin-operable device, including a coin-receiving member and a coin-collecting receptacle, for registering a particular coin demand determined by the subscription fee for the use of said intelligence signal;

a coin-deposit station and a coin-refund station;

a coin-ejecting mechanism for selectively discharging coins from said receptacle to said stations;

means responsive to satisfying said coin demand for providing a control effect;

a timing device responsive to said control effect for tolling a sampling interval of predetermined duration;

and means for associating said coin-ejecting mechanism with said refund station during said sampling interval but with said deposit station thereafter.

References Cited in the file of this patent

UNITED STATES PATENTS

| | | |
|---|---|---|
| 2,773,579 | Lutes | Dec. 8, 1956 |
| 2,839,173 | Loew et al. | June 17, 1958 |
| 2,875,270 | Wendt et al. | Feb. 24, 1959 |